United States Patent Office 3,126,763
Patented Mar. 31, 1964

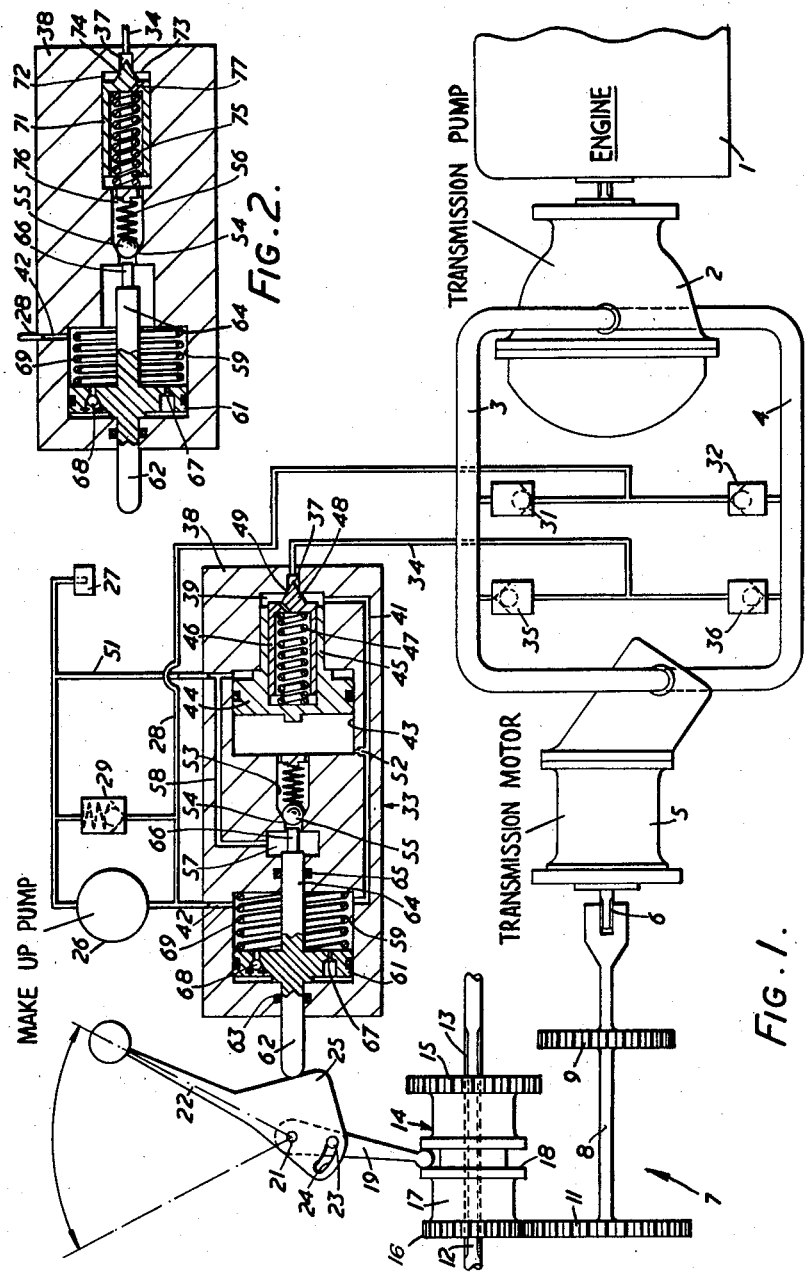

3,126,763
HYDRAULIC APPARATUS
Eric H. Bowers, Southbourne, near Emsworth, England, assignor to Dowty Hydraulic Units Limited, Ashchurch, England
Filed Nov. 2, 1961, Ser. No. 149,562
Claims priority, application Great Britain Nov. 10, 1960
9 Claims. (Cl. 74—733)

This invention relates to hydraulic apparatus and more particularly to a hydrostatic power transmission acting in combination with a mechanical change speed gear for transmitting mechanical power from a power source to a load. For the purpose of this specification a hydrostatic power transmission is defined as comprising a positive displacement hydraulic pump in hydraulic connection with a positive displacement hydraulic motor. There are a number of possible variations in the arrangement of a hydrostatic power transmission within the definition; for example, the pump or motor may be of variable positive displacement and/or may be arranged to give reversible displacement. Where the pump or the motor is of variable displacement, infinite variations in the speed ratio between the drive to the pump and motor output are possible. The mechanical change speed gears may be of any well known kind arranged to give a number of different positive speed ratios which are engageable as desired by an operator or automatically. For example, the speed ratios of mechanical gear may be comprised by a plurality of gear trains constantly in mesh which are engageable one at a time by means of friction clutches. Alternatively the mechanical gear may comprise a plurality of gear trains in which one or another train is engageable by bringing into mesh a pair of gears in the train. When a different speed ratio of the mechanical change speed gear is engaged the gears, the hydrostatic power transmission could be subjected to dangerously high shock loading due to the very quick change in speeds of the power source, as determined by the newly selected overall speed ratio between the power source and the load. Where the combination of hydrostatic power transmission and mechanical change speed gear is used as the power transmission on a vehicle between the engine and the ground engaging wheels, the change in mechanical gear can cause an extremely high loading to take place in the transmission in order to drive the engine at a different speed following a mechanical gear change due to the high inertia of the vehicle.

In a combination of hydrostatic power transmission with a mechanical change speed gear transmission, the present invention is characterised by the provision of means operative to control hydraulic slip in the hydrostatic transmission, and means responsive to the operation of the mechanical transmission control member to adjust the hydraulic slip control means such that a measure of hydraulic slip is allowed to occur in the hydrostatic transmission during each alteration of the speed change. Preferably, the latter means is arranged to be operative during a short period immediately after changing of mechanical speed ratio. The hydraulic slip control means may comprise a pressure relief valve capable of venting high hydraulic pressure from the transmission whereas the means for adjusting such may comprise means responsive to the operation of the control member to reduce the pressure setting of the valve during change of mechanical gear. In this way escape of pressurised hydraulic liquid from the hydrostatic transmission is permitted for pressure in excess of the reduced pressure setting of the valve. This ensures that the hydrostatic transmission will transmit no more than a predetermined load during mechanical speed ratio change. The means to reduce the pressure setting of the valve may be arranged in conjunction with a dashpot to increase the setting after a predetermined period, the period being of such duration as to prevent shock loading but to give a very slight interruption only in a power transmission. Alternatively the hydraulic slip control means may comprise a pressure relief valve in series with a shut-off valve which is normally shut but opens momentarily on changing of the mechanical speed ratio so as to permit escape of pressurised hydraulic liquid from the transmission whose pressure exceeds a value predetermined by the pressure relief valve. The means for adjusting the pressure setting of the pressure relief valve or the shut-off valve may be opened by mechanical, hydraulic, electric or other means simultaneously with changing of the mechanical speed ratio. Where the hydrostatic transmission is reversible and includes a pair of hydraulic flow passages extending between the pump and the motor the pressure relief valve is arranged to vent pressure liquid from one passage into the other passage in order to ensure that the transmission remains fully primed.

Two embodiments of the invention will now be described with reference to the accompanying drawings, in which, FIGURE 1 diagrammatically illustrates the first embodiment, and, FIGURE 2 shows a modified valve arrangement for substitution within FIGURE 1.

Referring initially to FIGURE 1 the power transmission shown is intended for power transmission on a vehicle from the vehicle engine 1 to ground engaging wheels (not shown). The engine 1 is connected to drive a reversible variable positive displacement transmission pump 2 of any known design. A pair of flow and return passages 3 and 4 extend from the pump to a fixed positive displacement hydraulic motor 5. From the motor 5 a drive shaft 6 extends to a gearbox 7 in which for convenience the working parts only are shown. The shaft 6 drives a shaft 8 within the gearbox to which are fixedly secured a pair of toothed gears 9 and 11 of differing diameters. The output shaft 12 from the gearbox is mounted in bearings substantially parallel to the shaft 8 and on the shaft 12 splines 13 are provided carrying a gear assembly 14. The assembly comprises a pair of toothed gears 15 and 16 integrally formed on a hub 17 including internal splines for sliding engagement on the splines 13. The hub 17 also includes a peripheral slot 18 in which a pivoted gear changing lever 19 is engaged. The lever 19 is pivoted on a fixed fulcrum 21 and is angularly movable by means of a manual lever 22 also carried by fulcrum 21. Lever 22 engages lever 19 by means of a pin 23 and slot 24 which effect a lost motion connection between the two levers. The lever 22 is also formed with a cam lobe 25 whose purpose will be described later in this specification. It will be seen that pivotal movement of the lever 19 in one direction or the other will move the gear assembly 14 so that either the gears 9 and 15 are in engagement to rotate the shaft 12 or alternatively the gears 16 and 11 are in engagement to rotate shaft 12.

In order to maintain the transmission primed with hydraulic liquid at low pressure a make-up pump 26 is provided which is preferably although not necessarily driven by the engine 1. Pump 26 draws liquid from a reservoir 27 and delivers it into delivery pipe 28. A pressure relief valve 29 extends from pipe 28 back to reservoir 27 to by-pass liquid in excess of a predetermined low pressure thus ensuring that a substantial volume of liquid is available in pipe 28 at a substantially constant pressure. A pair of non-return valves 31 and 32 extend respectively from pipes 3 and 4 to the pipe 28. These valves are so connected that the pipe 3 or 4 at higher pressure will maintain its associated valve closed while the other valve will permit flow of low pressure liquid from pipe 28 into its associated pipeline.

The hydraulic slip control means in accordance with the invention comprises the valve unit 33. This valve unit is connected through pipe 34 and non-return valves 35 and 36 extending respectively from pipes 3 and 4 to receive liquid from either the pipe 3 or 4 at the higher pressure. The pipe 34 enters into a port 37 within the body 38 of valve unit 33. The port 37 opens into the end of a cylindrical bore 39 from which a passage 41 extends back to a passage 42 in connection with pipe 28. The bore 39 opens into a considerably larger cylinder 43 co-axially disposed therewith. Within the cylinder 43 a piston 44 is slidably mounted from which a hollow sleeve 45 extends into the bore 39. Within the hollow sleeve 45 a plunger 46 is slidably mounted being located by an enclosed spring 47 toward the port 37. The outer end of plunger 46 includes a valve member 48 engageable on a valve seating 49 formed by the junction between ports 37 and the end of bore 39. The end of cylinder 43 adjacent to the bore 39 is provided with a connection 51 extending back to the reservoir 27. The end of cylinder 43 remote from bore 39 is connected by means of a restricted passageway 52 with the passageway 41.

Also from the end of cylinder 43 remote from bore 39 a substantially unobstructed passage 53 extends to a valve seat 54 on which a ball valve 55 engages. A spring 56 within passage 53 holds ball 55 on its seat. The seat 54 opens into a chamber 57 connected by a passage 58 to the pipe 51 which returns to reservoir.

Also within the valve body 38 a further cylindrical bore 59 is provided within which a piston 61 is slidably mounted. From piston 61 a rod 62 extends through one end of the cylinder 59 through a seal 63. The remote end of the rod 62 engages the cam 25 of control lever 22. From the opposite side of piston 61 a rod 64 extends through a seal 65 in the opposite end of cylinder 59 and terminates in a valve lifting member 66 engageable against the ball valve 55. Within piston 61 a restricted passageway 67 interconnects the two sides of the piston. Also within piston 61 a non-return valve 68 is provided permitting the piston 61 to be moved without substantial resistance in a direction to cause unseating of ball valve 55. A spring 69 in cylinder 59 ensures that the piston 61 is constantly urged into position where ball valve 59 can remain seated and also to cause the rod 62 to engage cam 25.

In operation of the transmission as described let it be assumed that the gears occupy the positions shown in FIGURE 1 and that it is desired to change the mechanical gear by moving the gear assembly 14 to cause gear 15 to engage gear 9. For this purpose the gear lever 22 is moved from right to left as seen in the drawing. The initial part of this movement will merely cause the cam 25 to depress rod 62 and piston 61, the slot 24 riding over pin 23. At the instance when the pin 23 makes contact with the opposite end of the slot, ball valve 55 will have been unseated by the unseating member 66. This initial movement of lever 22 will be substantially without restraint because of the fact that ball valve 68 will permit free flow of liquid. Incidentally, it will be noted that cylinder 59 is maintained primed with liquid at make-up pressure by virtue of the fact that it is located in series between passages 41 and 42. The unseating of the ball valve 55 will permit free flow of liquid from cylinder 43 through the passage 58 back to reservoir 27, the restricted passage 52 being of insufficient size to maintain liquid under pressure within cylinder 43 unless valve 55 is seated. The spring 47 will then be able to urge piston 44 to the left as seen in the drawing and the loading of spring 47 will thus be reduced. The loading of spring 47, having regard to the cross-sectional area of the seating 49, is so arranged that when it is compressed as shown in FIGURE 1 it will lift only if a pressure exceeding the maximum safe pressure for the transmission exists in pipe 34. Such a pressure may well be in the region of 5,000 lbs. per square inch. When the piston 44 moves to reduce loading of spring 47 the movement is arranged to be such that the loading now effected on valve member 48 can only resist a considerably lower pressure from pipe 34 in the neighborhood of 1500 lbs. per square inch.

Thus it will be seen that initial movement of lever 22 causes reduction in loading of spring 47. Further movement of lever 22 causes the end of slot 24 to engage pin 23 and the lever 19 will then be moved to cause gear changing movement of the gear assembly 14. When the gear 15 engages with the gear 9 a different speed through the gearbox 7 will be established. At the same time the vehicle speed remains substantially the same and thus there will be the tendency for the engine 1 to be driven through the hydrostatic transmission at a different speed. Such tendency will cause a pressure to be developed in one or other of the pipe lines 3 or 4. By virtue of the reduced loading of spring 47 it is arranged that such pressure cannot exceed the lower pressure value of about 1500 lbs. per square inch and liquid will thus vent through the valve seating 49 in order to prevent this pressure being exceeded. The vented liquid will pass through passage 41, cylinder 59, passage 42, pipe 28 and through one or other of the non-return valves 31 and 32 into the pipe 3 or 4 at the lower pressure. Thus excess liquid which leaves the transmission is returned through the pipe 28 ensuring that the transmission does not loose liquid and thus become ineffective. When the lever 22 has moved to a position causing gear 15 to engage gear 9 the lobe 25 will have moved past the piston rod 62 and the piston 61 will be able to return to the position shown in the drawing under the action of spring 69. However, such movement of the piston requires transfer of liquid from the left hand to the right hand end of the cylinder 59 as seen in the drawing which will cause closure of valve 68 and compel all liquid to pass through the restriction 67. Thus the return of piston 61 will take a predetermined time period. Thus it will be seen that the valve 55 is held off seat 54 for a predetermined time period after the gear 15 has engaged gear 9 and within this period pressure within the transmission cannot exceed a value determined by the reduced loading of spring 47. This pressure is so selected as to be capable of exerting a sufficient load on the engine to adjust it to a new speed of rotation as determined by the ratios between gears 9 and 15 and the speed ratio of the hydrostatic transmission. When the valve 55 finally seats make-up pressure entering cylinder 43 through restriction 52 will build up pressure to cause piston 44 to move to the position shown in the drawings where it will exert maximum compression on spring 47 to increase the pressure capable of lifting valve 48 to the normal safe high pressure limit for the transmission. Thus immediately after the valve 55 seats, the engine will be running at substantially a different speed corresponding with the change in gear ratio of the gearbox and it will then be able to exert full driving force in accordance with the new overall speed ratio of the gearbox and hydrostatic transmission. Substantially similar action will take place when the gear lever 22 is moved to cause re-engagement of the gears 11 and 16.

Reference is now made to FIGURE 2 of the accompanying drawings which illustrates in cross-section a valve unit capable of replacing the valve unit 33 in FIGURE 1 to operate as a hydraulic slip control means. This valve unit has some features in common with the valve unit 33 and where possible similar reference numerals will be employed. As in FIGURE 1 the valve unit includes a cylinder 59 within which piston 61 is slidably mounted, the piston including a piston rod 62 extending from the valve body 38 for engagement with the cam lobe 25 of lever 22 in FIGURE 1. Piston 61 also includes a piston rod 64 extending in the opposite direction and terminating in a reduced portion 66 for lifting a spring loaded ball valve 55 from its seat 54. Within the piston 61 a restriction 67 is provided and also a non-return valve 68 both of which interconnect opposite sides of the piston. The piston 61 is urged towards the left as seen in the drawing by means of a spring 69 located within cylinder 59. At the opposite end of the body a port 37 receives pressure liquid from pipe 34 connected to the transmission as shown in FIGURE 1. A valve plunger 71 slidably mounted within a cylinder 72 within the body 38 into one end of which the port 37 opens to form a seating 73. A projection 74 from plunger 71 is arranged for engagement with the seating 73. Within the bore 72 a compression spring 75 urges the plunger 71 so that projection 74 engages seat 73. From the end of cylinder 72 opposite to the seat 73 a passage 76 opens to the seating 54 of ball valve 55. Spring 56 is located within passage 76 to urge ball valve 55 on to its seat. A passage 42 extends from cylinder 59 for connection with pipe 28 carrying make-up pressure into the transmission as illustrated in FIGURE 1.

For operation of the system including the valve unit of FIGURE 2 it is assumed that the lever 22 is in the position as shown in FIGURE 1 with gears 16 and 11 in engagement and that it is desired to move lever 22 to cause gears 15 and 9 to engage. Initial movement of lever 22 will cause movement of the cam 25 to depress piston rod 62. Such movement is transmitted to the piston 61 and very little resistance is offered because of the fact that check valve 68 permits free flow of liquid from the right to the left hand side of the piston as seen in the drawing. Such movement also causes the piston rod 64 at its reduced end 66 to engage the ball valve 55 and lift it from its seat. The loading applied to the springs 75 represents an intermediate transmission pressure of about 1500 lbs. per square inch with the result that when the ball valve 55 is lifted from its seat assuming that pressure in pipe 34 is greater than 1500 lbs. per square inch there will be an immediate flow of pressure liquid which lifts the projection 74 from seating 73. Normally, when the ball valve 55 is on its seat, the liquid then trapped in the passage 76 and cylinder 72 forms a hydraulic lock on the plunger 71 which will prevent the latter from lifting regardless of what pressure is applied to pipe 34. If valve 71 were to lift due, for example, to compression of liquid within passage 76 and 72, slight flow of liquid would occur into the bore 72 which would then permit plunger 71 to urge valve 74 again onto its seat. When, however, ball valve 55 is unseated by the projection 66, hydraulic lock behind plunger 71 is removed and then liquid from passage 34—provided it exceeds the pressure represented by spring 75 acting over the area of seat 73—will lift plunger 71 and liquid will then flow from passage 34 through opening 77 into passage 76 and over the seating 54. The liquid then enters the cylinder 59 and leaves through passage 42 and pipe 28 to be directed into the transmission pipe lines 3 or 4 at make-up pressure. Further movement of lever 22 will cause the pin 23 to engage the end of slot 24 so that force can be applied to lever 19 to move gear assembly 14 to the right so that gear 16 disengages from gear 11 and gear 15 engages with gear 9. As a result of the engagement of gear 15 with gear 9 a new overall transmission ratio is generated between the output shaft 12 and the engine 1 with the result that the engine 1 will assume a new speed corresponding to the speed of the vehicle if transmitted through the new overall speed ratio the torque to drive the engine being limited to the fact that transmission pressure cannot exceed 1500 lbs. per square inch. After the engagement of gear 15 with gear 9 the lobe of cam 25 will have passed over the piston rod 62 so that the spring 69 may now operate to return piston 61 to the left as seen in the drawings. Such return movement is limited by the fact that check valve 68 closes and the only escape for liquid trapped on the left hand side piston 61 is through the restriction 67. This ensures a short time delay before the piston 61 can move to the extent that valve 55 may again seat. Immediately the valve seats, flow of liquid through the port 37 is entirely prevented to cause pressure to build up in the transmission for power transmission in the normal way. For this purpose the short period during which pressure is limited to 1500 lbs. per square inch will have ensured that the engine will be rotating at a substantially correct speed to effect drive to the output shaft 12. When the valve unit of FIGURE 2 is used it will be clear that it is necessary for the transmission to include a separate maximum high pressure relief valve. The same action will taken place when it is decided to re-engage the gear 16 with the gear 11.

In both examples it will be seen that when a new pair of gears are engaged within the gearbox that the torque which the hydrostatic transmission is capable of transmitting during the engagement of the new gears and for a short period thereafter is limited in value thus permitting slip of the transmission to take place during the time that the engine is being accelerated or decelerated to a new speed corresponding to the new overall gear ratio.

It has previously been mentioned that the transmission pump 2 is of variable displacement but since such displacement variation is not relevant to the present invention no means for displacement control are illustrated. It will be appreciated that the invention applies equally as well where the transmission pump is of fixed displacement. However, the invention is of particular use when the hydrostatic transmission is of infinitely variable speed ratio by the provision of means to adjust displacement of the transmission pump. The mechanical change speed gearbox can then be selected to have such ratios as to considerably extend the speed ratio over which the hydrostatic transmission is efficiently operable.

I claim as my invention:

1. A power transmission for transmitting power from a power source to a load comprising a hydrostatic transmission formed by a positive displacement hydraulic pump driven by the power source, a positive displacement hydraulic motor, and a pair of hydraulic passages interconnecting the pump and motor to form flow and return passages, a mechanical change speed gear in power transmitting relation with the hydrostatic transmission, a selector to select any of a plurality of fixed speed ratios for the mechanical gear, a first pair of non-return valves extending one from each of the flow and return passages, a high pressure passage to which the first pair of non-return valves are both connected to transmit thereto the higher pressure existing in the flow and return passages, a spring loaded valve connected to the high pressure passage, a low pressure passage extending from the spring loaded valve, a second pair of non-return valves extending to the flow and return passages from the low pressure passage to transmit liquid from the low pressure passage into the passage of the flow and return passages at lower pressure and means operable by the selector during selection of a speed ratio of the mechanical gear to cause the spring loaded valve to vent the hydraulic liquid between flow and return passage in excess of a predetermined pressure through a first and a second non-return valve.

2. In combination, an input shaft and an output shaft, a hydrostatic transmission driven by the input shaft, a change speed mechanical gear transmission interconnecting the hydrostatic transmission with the output shaft, a control member operative to alter the speed change of the mechanical gear transmission, means operative to control hydraulic slip in the hydrostatic transmission, and means responsive to the operation of the mechanical transmission control member to adjust the hydraulic slip control means such that a measure of hydraulic slip is allowed to occur in the hydrostatic transmission during each alteration of the speed change.

3. In combination, an input shaft and an output shaft; a hydrostatic transmission comprising a positive displacement pump driven by the input shaft, a positive displacement hydraulic motor, and a hydraulic circuit interconnecting the pump and the motor; a change speed mechanical gear transmission interconnecting the motor with the output shaft; a control member connected with the mechanical gear transmission and operative to alter the speed change thereof; means operative to control hydraulic slip between the pump and the motor; and means responsive to the operation of the mechanical transmission control member to adjust the hydraulic slip control means such that a measure of hydraulic slip is allowed to occur between the pump and the motor during each alteration of the speed change.

4. The combination according to claim 3, wherein the hydraulic slip control means includes a pressure relief valve which is connected with the hydraulic circuit of the hydrostatic transmission and set to vent liquid therefrom above a predetermined high pressure.

5. The combination according to claim 4, wherein the means for adjusting the hydraulic slip control means includes means responsive to the operation of the mechanical transmission control member to lower the pressure setting of the pressure relief valve.

6. The combination according to claim 5, wherein the means for lowering the pressure setting of the pressure relief valve includes a shut-off valve arranged in series with the pressure relief valve.

7. The combination according to claim 3, wherein the mechanical transmission control member has a lost motion connection with the mechanical gear transmission and the means for adjusting the hydraulic slip control means is responsive to the operation of the control member during its lost motion.

8. The combination according to claim 3, wherein the means for adjusting the hydraulic slip control means includes timing means which are operable to prolong the adjustment in the hydraulic slip control means for a given time following each alteration of the speed change.

9. The combination according to claim 8, wherein the timing means includes a piston and cylinder dashpot device operative on the hydraulic slip control means.

References Cited in the file of this patent

UNITED STATES PATENTS

| | | |
|---|---|---|
| 2,222,144 | Ferris | Nov. 19, 1940 |
| 2,939,342 | Woydt | June 7, 1960 |